United States Patent  [15] 3,699,197
Egger  [45] Oct. 17, 1972

[54] METHOD OF PRODUCING RUBBER PROFILES

[72] Inventor: Georg M. Egger, Kirchstrasse 144, 3084 Wabern, Switzerland

[22] Filed: April 20, 1971

[21] Appl. No.: 135,590

Related U.S. Application Data

[63] Continuation-in-part of Ser. No. 105,112, Jan. 8, 1971, Continuation of Ser. No. 773,745, Nov. 6, 1968, abandoned.

[52] U.S. Cl. ............264/40, 264/178 R, 264/210 R, 264/290 R, 425/71, 425/167, 425/168
[51] Int. Cl. ...........................B29c 17/02, B29n 5/01
[58] Field of Search.........264/40, 178 R, 178 F, 201, 264/210 R, 210 F, 290 R; 425/71, 162, 168, 404

[56] References Cited

UNITED STATES PATENTS

| | | | |
|---|---|---|---|
| 1,594,845 | 8/1926 | Myers | 264/40 |
| 2,369,858 | 2/1945 | Ryan | 118/6 |
| 2,414,524 | 1/1947 | Harris et al. | 179/175.3 |
| 2,452,884 | 11/1948 | Werner | 264/178 |
| 2,454,731 | 11/1948 | Burkholder | 425/168 |
| 2,499,421 | 3/1950 | Samler | 264/178 |
| 3,051,992 | 9/1962 | Bradley | 264/178 |
| 3,150,213 | 9/1964 | Doering | 264/40 |
| 3,184,788 | 5/1965 | Serrano | 425/140 |
| 3,286,302 | 11/1966 | Doering | 18/2 |

Primary Examiner—Robert F. White
Assistant Examiner—J. H. Silbaugh
Attorney—Imirie & Smiley

[57] ABSTRACT

Method for the production of rubber profiles of predetermined cross-sectional dimensions by subjecting a vulcanizable rubber profile in the form of a continuous length to stretching, then feeding the stretched profile to a liquid heating medium to vulcanize the rubber and fix the desired cross-sectional dimensions, while automatically adjusting the speed of withdrawal of the profile from the liquid medium into relation to the feeding speed thereinto so as to maintain a substantially constant radio of withdrawal speed to feeding speed.

5 Claims, 4 Drawing Figures

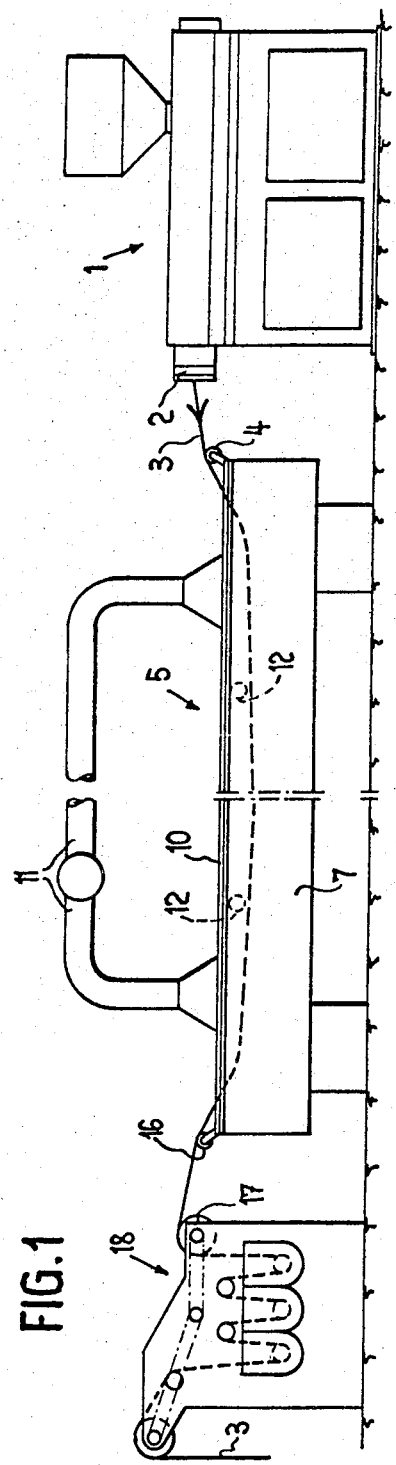
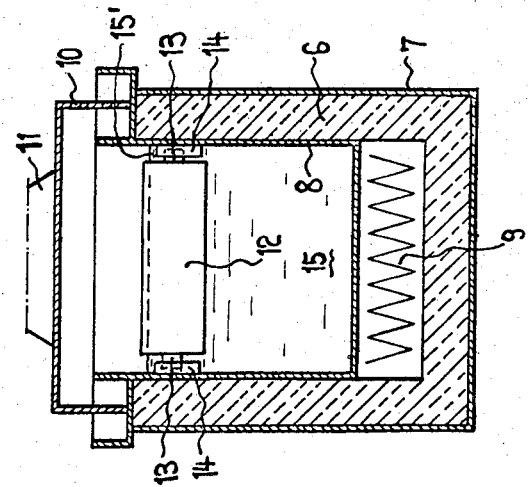
FIG. 1
FIG. 2
INVENTOR
Georg M. Egger

INVENTOR
GEORG M. EGGER
BY
*Imirie and Smiley*

1

METHOD OF PRODUCING RUBBER PROFILES

CROSS-REFERENCE TO RELATED APPLICATION

This application is a continuation-in-part of application Ser. No. 105,112, filed Jan. 8, 1971, as a streamlined continuation of application Ser. No. 773,745, filed Nov. 6, 1968, and now abandoned.

BACKGROUND OF THE INVENTION

This invention relates to a novel method for the continuous production of rubber profiles. By rubber profile is meant a continuous length or strip of rubber, said strip having a particular cross-sectional configuration, depending upon the use to which the profile is to be put, for example, a sealing strip. In prior methods the rubber profile is extruded from a nozzle of an extruder then vulcanized by advancing it through a heating medium, for instance a bath of a heated liquid such as an eutectic mixture of salts, and then washed and dried. Other heating mediums have also been used, for instance a "fluid bed" consisting of fine glass pearls or beads fluidisied by hot air, high frequency heating or hot air heating.

With all these prior methods it is extremely difficult to obtain constant cross-section of the profile and to keep the variations in cross-section within narrow limits. This is due to the fact that the extruding speed, that is the speed at which the profile leaves the extruding nozzle is subject to appreciable variations while the speed at which the vulcanized profile is maintained substantially is constant. It is obvious that variations in cross-section must occur when the extruding speed varies while the speed of the vulcanized profile is practically constant.

Another drawback of prior methods and devices for producing rubber profiles resides in the impossibility to determine the size of the cross-section of the vulcanized profile in a manner other than by the choice of the size of the extruding nozzle. Since the means extruding speed and the means feeding speed of the vulcanized profile are adjusted to practically the same value, the cross-section of the vulcanized profile is exclusively determined by the cross-section of the nozzle aperture. Proper coordination and adjustment of the extruding speed which depends on a number of factors and of the feeding speed of the vulcanized profile is difficult so that adjustment of the producing plant is a time-consuming operation requiring highly qualified staff, whereby appreciable quantities of rubber may be wasted during the adjusting period.

SUMMARY OF THE INVENTION

In accordance with the present invention there is provided a novel method for the preparation of a rubber profile having a desired cross-sectional configuration which comprises the steps of:

a. subjecting a vulcanizable rubber profile to a sufficient degree of stretching to achieve a predetermined cross-sectional dimension when stretched;

b. feeding a length of said profile while being stretched through a liquid heating medium which acts at a vulcanizing temperature to vulcanize the rubber and fix said predetermined cross-sectional dimension thereof;

c. while adjusting the withdrawal speed of the profile from the bath in relation to the feeding speed of the profile into the bath so as to maintain a substantially constant ratio of said withdrawal speed to said feeding speed. This adjustment may be made automatic.

The foregoing method is particularly adapted to the continuous treatment of running lengths of rubber profiles so as to achieve small but otherwise difficulty producible cross-sectional dimensions and configurations such as, for example, insulation strips for automatic body use or highway joint sealing strips. The process permits stretching of the profile during the first few feet of passage into the bath and before the commencement of vulcanization. It also greatly decreases the amount of scrap and waste as compared with known methods.

The method of the present invention has the further advantage that it permits the use of only a single extrusion die, which may be, for example, slightly larger than the desired profile cross-section, followed by stretching of the profile to a degree whereby the desired cross-sectional size is attained, the latter size then being fixed by the vulcanization step. Thus, the process of the invention eliminates one of the drawbacks of prior processes wherein it is necessary to change the extrusion die each time it is desired to produce a different profile size. The process of the invention further permits the control of the final cross-sectional dimensions of the profile very exactly and with smaller tolerances than heretofore attainable, and with little or no scrap production. A further advantage is that several parallel length pieces of the same or different profiles may be treated in the same apparatus.

The vulcanizable rubber profile employed in accordance with the invention may be made of any suitable rubber such as natural or synthetic rubber or mixtures thereof. Examples of synthetic rubbers which may be employed include, but are not limited to, butadiene-styrene, butadiene-acrylonitrile, neoprene, acrylonitrile-butadiene-styrene, and the like.

The rubber profile itself may be prepared in any conventional manner such as, for example, extrusion or rolling, in the form of continuous lengths, of any desired cross-sectional configuration, but extrusion is preferred for the purpose of the invention.

The degree of stretching employed in accordance with the invention may vary over a wide range, from as little as 1–2 percent up to as much as 1,000 percent or higher, depending upon the properties of the rubber. Ordinarily, however, and in accordance with the preferred practice of the invention, the stretch will be between about 100 percent and 300 percent of the original length. This stretch is accompanied by a corresponding decrease in the cross-sectional dimension of the profile. Accordingly, the amount of stretching applied to the profile will be that which is sufficient to reduce the original cross-section to the desired dimensions.

The stretching is produced by the withdrawal of the profile out of the vulcanizing bath at a speed higher than that at which it is fed into the bath. This may be accomplished by passing the running length of the profile over a roller, the frictional force being sufficient to produce the rolling, or alternatively between a pair of rollers. The stretching begins immediately after the profile enters the vulcanization zone and before the start of the vulcanization itself and takes place within the first two or three feet after immersion of the profile in the bath. Thus, for example, if the extrusion speed increases by 1 foot per minute, the withdrawal speed automatically increases by 3 feet per minute, in order to maintain the stretch.

The vulcanization bath, which acts essentially as a heat transfer medium, will advantageously have a specific gravity approximating that of the rubber profile material itself, so that the profile will float or be suspended in the body of the liquid and will not be subject to sagging whereby it might be damaged. If the specific gravity is too high, the profile will remain on the surface and will not be vulcanized properly. The latter difficulty may be encountered when the vulcanization bath is one of the molten hot salt type having a relatively high density, but may be offset by forcing the profile below the surface by mechanical means such as a steel guide belt, but this expedient prevents the successful application of stretching.

The vulcanization bath is preferably a liquid bath containing a material which will not adversely affect the rubber. In accordance with the invention there is preferred a bath comprising a polyhydric alcohol such as glycerol or ethylene glycol, the glycerol being preferred for economic reasons. Such baths have the advantage of being water soluble so that adhering bath material can readily be removed from the profile after vulcanization by water washing. Moreover, the polyhydric alcohol exerts a favorable preservative action on the rubber during the treatment.

When the rubber profile enters the bath, it softens under the impact of the heat, permitting the stretch in the profile to take place. After the commencement of vulcanization, the stretching stops and the profile cross-section is set, having the same contour or configuration as that of the original extruded material, but smaller.

In accordance with a presently preferred embodiment of the invention, the rubber profile is extruded from a nozzle of an extruder and passed through a liquid heating medium for vulcanization, as previously described. Due to the continuous automatic adjustment of the withdrawal speed of the profile in relation to the feeding speed of the profile from the extruder, the cross-sectional dimension may be maintained constant and profiles of different sizes may be produced from the same nozzle with only a change in the degree of stretch, that is, by adjustment of the ratio between the withdrawal speed and the extruding speed. Initial adjustment of the plant is very simple, it being only necessary to adjust the desired speed ratio which is thereafter maintained constant by automatic control independently of the extruding speed, as explained more fully below.

BRIEF DESCRIPTION OF THE DRAWINGS

FIG. 1 is a side view of the device;
FIG. 2 is a cross-section of the heating section of the device at a larger scale.

DETAILED DESCRIPTION OF THE INVENTION

Figure 3:
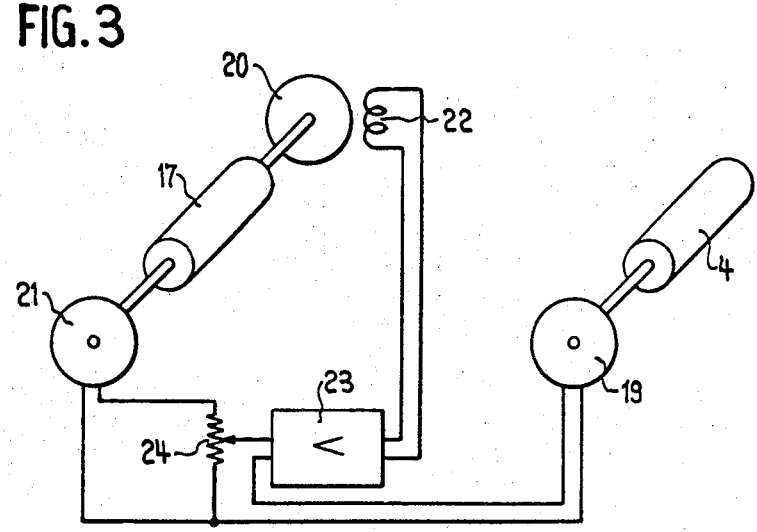
FIG. 3 is a circuit diagram of a control unit.

The producing apparatus shown in FIG. 1 comprises an extruder 1 suitable for extruding rubber through a nozzle 2. Any conventional rubber extruder may be used, but it has been found to be preferable to use an extruder particularly designed for extrusion of plastic material and including a relatively long feeding helix having a length in the order of 20 times its diameter.

The rubber profile 3 extruded from the nozzle 2 passes over a guide roller 4 into an elongated vessel 5 having a cross-section as shown in FIG. 2. A heat insulating layer 6 is inserted between the outer mantle 7 and an inner channel-shaped container 8 of the vessel. Electric heating units 9 are accommodated below the container 8 as schematically indicated. The vessel has a cover 10 and gases accumulating between the container 8 and the cover 10 may be sucked off through pipes 11 mounted on the cover.

Guide or dipping rollers 12 are mounted in the upper portion of container 8. The shafts 13 of rollers 12 removeably engage in vertical slots of blocks 14 fixed on the walls of container 8. A heat transfer medium 15 fills the container 8 to a level 15' such that the rollers 12 are dipped into this medium. Any suitable medium, for instance one of the mediums mentioned above may be used, but it is preferred to use a liquid medium mentioned above suitable for being heated to treating temperatures of 140°–220° C. and having a specific weight in the order of the specific weight of the rubber profiles to be treated. Special oils or suitable polivalent alcohol having a high boiling point may be used.

The extruded profile 3 passes below guide rollers 12 and is dipped into the heating medium 15, this being particularly important when the weight of the profile is so small that it would float on the medium 15. This will often be so when profiles of sponge rubber are produced or when hollow profiles are produced.

At the outlet or exit end of the treating vessel 5 the vulcanized profile passes over a guide roller 16 and then over a driven profile pulling or withdrawing roller 17 of a unit 18 for final treatment of the profile, that is for washing, drying, and applying talcum powder to the profile and for winding it onto take-up reels. Unit 18 is classical in design and operation and needs no further explanation.

Figure 4:
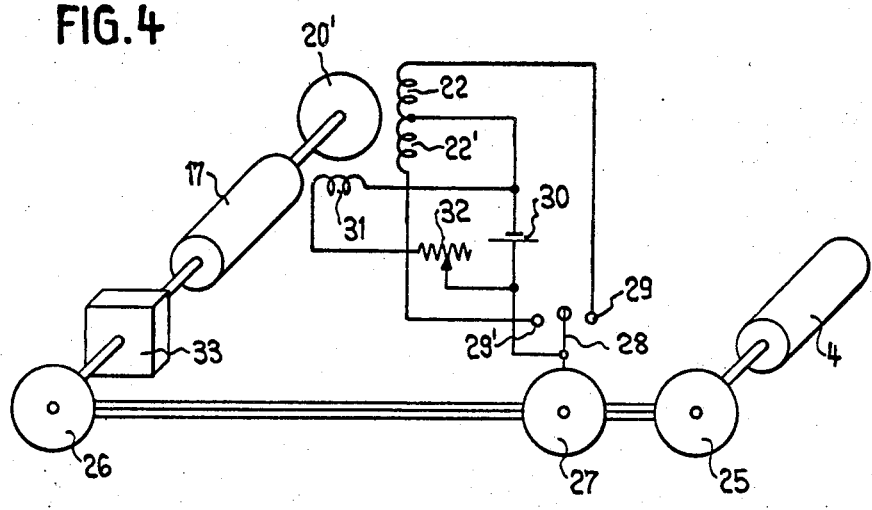
FIG. 4 is a circuit diagram of another control unit.

Automatic control means are provided as schematically illustrated at FIGS. 3 and 4 for continuous automatic coordination of the extruding speed of the profile, that is, its speed when leaving the nozzle 2, and the withdrawing speed of roller 17. As shown in FIG. 3, the guide and feed roller 4 at the inlet end of the heating and vulcanizing section 5 is coupled to a direct-current control-signal generator or tachometric generator 19. Withdrawing roller 17 is driven by a motor 20 through a suitable reduction gear, not shown, in FIG. 3, and a second direct-current control-signal generator or tachometric generator 21 is coupled with withdrawing roller 17. Driving motor 20 is a direct current motor having an exciting winding 22 connected to the output of an amplifier 23. Generators 19 and 21 are connected to the input of amplifier 23, whereby any desired portion of the signal produced by generator 21 may be applied to the amplifier 23 by means of a potentiometer 24. Amplifier 23 is controlled by the difference of the signals applied from generator 19 on one hand and from generator 21 through potentiometer 24 on the other hand. The output current of amplifier 23 may be adjusted to a desired value for no voltage difference at the amplifier input, the output current increasing or decreasing in accordance with the polarity and value of any voltage difference appearing at the amplifier input.

For starting up operation of the device, the heating medium 15 is first heated to the required temperature in the range between 140° and 220° C. The extruder and unit 18 are prepared for operation. When the treating temperature is reached, the extruder is started up and the extruded profile is pulled through the container 8 as is well known in the art by means of a wire, not shown, and is inserted into unit 18.

Before inserting the profile over the withdrawing roller 17 into the unit 18, the motor 20 and the amplifier 23 have been started and switched on respectively, and the potentiometer 24 has been adjusted to a desired value. During operation the feed roller 4 and the generator 19 are rotated at a speed corresponding to the extruding speed of the profile. Therefore, the signal applied from generator 19 to the amplifier 23 corresponds or is analogous to the extruding speed. Generator 21 produces a signal corresponding to the speed of motor 20 and of the withdrawing roller 17. Accordingly, this signal is analogous to the advancing or discharge speed of the vulcanized profile at the outlet of the heating and vulcanizing section 5. A portion determined by the adjustment of potentiometer 24 of this signal is applied to the input of amplifier 23.

Assuming that the potentiometer 24 is adjusted to its upper end, that is, the full signal of generator 21 is applied to the amplifier, and assuming further that generators 19 and 21 have the same characteristics, no signal difference appears at the amplifier input when rollers 4 and 17 rotate at the same speed. As soon as the speed of roller 4 changes due to variations in the extruding speed of the profile, the signal from generator 19 changes accordingly. The voltage difference thereby appearing at the amplifier input causes a change of the output current of the amplifier and of the exitation by winding 22 respectively. With a high gain of amplifier 23 the speed of motor 20 and roller 17 are adjusted to a value for which the signal difference at the amplifier input practically disappears, whereby the speed of roller 17 is adapted to the speed of roller 4. In other words, the withdrawing speed of the profile is adjusted to the extruding speed.

Usually the potentiometer 24 is so adjusted that only a portion of the signal from generator 21 is applied to the amplifier input. It is obvious that under these circumstances the generator 21 and roller 17 coupled therewith have to rotate at a higher speed than generator 19 and roller 4 respectively in order that no signal difference appears at the amplifier input. Accordingly, motor 20 is accelerated until the signal difference at the amplifier input is practically reduced to zero. Variations of the extruding speed are compensated in the manner set out above, but since only a part of the control signal of generator 21 acts on the amplifier 23, the speed variations of roller 17 must be accordingly higher for compensation of the speed variations of roller 4. Therefore, not only the ratio of the speeds of rollers 4 and 17 may be selected as desired by setting of potentiometer 24, but the ratio of speed variations may be adjusted accordingly. Thus, the stretching effect will always be the same independently of variations of the extruding speed. Since the ratio between the extruding speed and withdrawing speed of roller 17 may be adjusted within wide limits, for instance from 1 : 1 to 1 : 10, the size of the cross-section of the stretched and vulcanized profile relatively to the size of the extruding nozzle may be selected within the same wide limits. Motor 20' nozzle may thus be used for production of similar profiles of different sizes.

FIG. 4 illustrates another control system, wherein the same elements are similarly designated as in FIG. 3. Instead of d.c. generators 19 and 21, three-phase alternating generators 25 and 26 connected to a phase indicator 27 of well known design are provided. This phase indicator tends to turn in the one or other direction according to whether the one or other of generators 25 and 26 rotates faster. A contact finger 28 is mounted on the phase indicator 27 of which the rotating angle is limited. When the phase indicator 27 rotates in clockwise or counterclockwise direction the contact finger 28 touches one of two fixed contacts 29 or 29' respectively and closes a circuit from a battery 30 through contact finger 28, contact 29 or 29' and winding 22 or 22' respectively. MOtor 20 has a main exciting winding 31 connected to the battery 30 through a potentiometer 32 for adjustment of the exciting current in winding 31. Coils 22 and 22' are booster windings wound in opposite sense changing the stator field and speed of motor 20'. A variable mechanical gear 33 is mounted between withdrawing roller 17 and generator 26.

For operation the motor speed is adjusted to a suitable value by means of potentiometer 32 and the desired speed ratio between roller 17 and roller 4 is adjusted by the variable gear 33. Therefore, although roller 17 may rotate at a higher speed than roller 4, generators 25 and 26 will rotate at the same speed. As long as these generators are in phase and synchronism, the phase indicator 27 is in zero position as shown. Any speed difference between generators 25 and 26 results in rotation of the phase indicator and energization of one of the booster windings 22 or 22' through contact 29 or 29'. Thereby the speed of motor 20' increases or decreases in order to reestablish synchronism between generators 25 and 26 and the rotation of rollers 4 and 17 is kept in rigid synchronism by means of the synchronized generators 25 and 26 and gear 33, whereby the speed ratio may be preselected in wide limits by adjustment of the transmission ratio of gear 33.

Other control circuits, for instance digital circuits controlled by pulse generators rotating with rollers 4 and 17 may be used, as far as such circuits are capable to control the speed of roller 17 proportionally with the speed of roller 4 at various speed ratios.

The following examples serve to illustrate the practice of the invention but are not to be regarded as limiting:

EXAMPLE 1

For the manufacture of an automobile body sealing strip, a natural sponge rubber mix of conventional type containing necessary vulcanizing agents, accelerators, fillers and the like, is fed into an extruder of conventional design. Using the apparatus illustrated in the accompanying drawings, the extruder is operated at a speed such that the profile emerges from the nozzle thereof at a speed of approximately four meters per minute, thence passing loosely over feed roller 4 and into a vulcanization bath composed of glycerol heated to a temperature of 180° C. The profile emerging from the bath passes over withdrawal roller 17 and thence to washing apparatus 18. The speed of roller 17 is responsive to a change in the speed of feed roller 4. The difference in speed between that of the withdrawal roller 17 and the feed roller 4 is what is required to achieve a stretch of about 450 percent. The apparatus is adjusted so that a variation of as much as 10 percent or possibly more in the nozzle speed is corrected automatically by the apparatus with the cross-sectional dimension of the profile being maintained substantially unchanged.

EXAMPLE 2

For the manufacture of a highway joint seal and proceeding as described in Example 1, a neoprene solid rubber mix with vulcanization ingredients is fed to the extruder, emerging therefrom at a nozzle speed of about 8 meters per minute, while the withdrawal speed is maintained by roller 17 at about 16 meters per minute, the difference in the two speeds being sufficient to produce about 100 percent stretch in the profile.

I claim:

1. Method for the production of a rubber profile having a desired cross-sectional configuration, comprising the steps of:
   a. continuously producing a vulcanizable rubber profile having a selected cross-sectional configuration;
   b. feeding said profile at the speed at which it is produced into a liquid heating medium at vulcanizing temperature to vulcanize the rubber;
   c. pulling the profile through and from the heating medium at a pull speed sufficient to stretch the profile within the heating medium prior to vulcanization and achieve a predetermined cross-sectional dimension;
   d. measuring the feeding speed of the profile; and
   e. adjusting the pull speed of the profile from said medium in relation to the measured feeding speed of the profile into the medium to maintain a substantially constant ratio of said pull speed to said feeding so that the profile retains its predetermined cross-sectional configuration regardless of feeding speed variations.

2. The method of claim 1 in which the size of the cross-section of the vulcanized profile is determined by the selection of the ratio between the withdrawal speed and the feeding speed.

3. The method of claim 1, in which the temperature of the liquid heating medium is between about 140° C. and about 220° C.

4. The method of claim 1 in which said liquid heating medium has a specific gravity of the order of magnitude of the specific gravity of the rubber profile.

5. The method of claim 1 in which said profile is fed from the nozzle of an extruder.

* * * * *